United States Patent [19]

Miropolsky et al.

[11] 4,162,219
[45] Jul. 24, 1979

[54] SELF-CLEANING FILTER

[75] Inventors: Mark U. Miropolsky; David L. Maizlik; Anatoly A. Dobrovolsky; Igor K. Gerasimovich; Ariel S. Levinson; Iosif P. Naidich, all of Moscow; Georgy A. Menkh, Kemerovo; Alexandr A. Yasminov, Moscow, all of U.S.S.R.

[73] Assignee: Proizvodstvennoe obiedinenie "Tekhenergokhimprom", U.S.S.R.

[21] Appl. No.: 869,012

[22] Filed: Jan. 12, 1978

[30] Foreign Application Priority Data

Jan. 28, 1977 [SU] U.S.S.R. .............................. 2447783

[51] Int. Cl.² ............................................. B01D 35/16
[52] U.S. Cl. .................................. 210/108; 210/333 R; 210/345; 210/411; 210/414; 210/456
[58] Field of Search ............... 210/107, 108, 232, 343, 210/345, 413, 414, 410, 456, 486, 487, 411, 414, 333 R, 415

[56] References Cited

U.S. PATENT DOCUMENTS

| 174,297 | 2/1876 | Prange | 210/345 |
| 256,853 | 4/1882 | Pitt | 210/97 |
| 729,693 | 6/1903 | Steinkoenig | 210/456 |
| 3,072,258 | 1/1963 | Saxby | 210/343 |
| 3,373,875 | 3/1968 | Krikorian | 210/456 |
| 4,085,051 | 4/1978 | Kaminsky et al. | 210/411 |

FOREIGN PATENT DOCUMENTS

| 122981 | 10/1900 | Fed. Rep. of Germany | 210/345 |
| 2213444 | 10/1973 | Fed. Rep. of Germany | 210/108 |
| 2299899 | 9/1976 | France | 210/413 |

Primary Examiner—Charles N. Hart
Assistant Examiner—David R. Sadowski
Attorney, Agent, or Firm—Steinberg & Blake

[57] ABSTRACT

The self-cleaning filter for purifying a liquid from suspended particles has a housing with pipes for the inlet of the liquid to be purified and for the outlet of the clarified liquid, accomodating at least one filtering partition dividing the internal space of the housing into chambers for the liquid to be purified and for the clarified liquid, and means for flushing this partition with a countercurrent of the clarified liquid. The inlet pipe for the liquid to be purified is arranged on the housing within the chamber for the clarified liquid so that its geometric axis is substantially parallel with the plane of the filtering partition and communicates with another pipe received in the chamber for the clarified liquid so that its geometric axis extends centrally of this chamber, substantially perpendicular to the plane of the filtering partition, the latter having made therein an opening the edges whereof are connected to said another pipe.

The disclosed filter is characterized by reliable performance and relatively simple structure.

1 Claim, 2 Drawing Figures

SELF-CLEANING FILTER

The present invention relates to apparatus for purifying liquids, and, more particularly, it relates to self-cleaning filters for purifying or clarifying a liquid from particles suspended therein.

Self-cleaning filters for purifying liquids, constructed in accordance with the present invention, can be most advantageously used for purifying water from solid particles. However, such self-cleaning filters can be used as efficiently in the chemical, metallurgical, pulp-and-paper, food and other industries.

There are known self-cleaning filters for purifying a liquid with a housing having inlet pipes for the liquid to be purified and the outlet pipes for the clarified liquid. Mounted within the housing are filtering partitions dividing the internal space of the housing into chambers for the liquid to be purified and for the clarified liquid. The housing further accommodates therein a device for flushing the filtering partition with a countercurrent of the clarified liquid, this device being mounted in the housing and adapted to move relative to the filtering partition.

In this known filter the inlet pipes for the liquid to be purified are arranged in the housing of the filter within the chamber for the liquid to be purified.

However, a self-cleaning filter of the above-described construction presents certain problems in operation, since with the inlet pipe for the liquid to be purified being arranged within the chamber for the liquid to be purified, any replacement of the filtering partition and adjustment of the engagement of the device for flushing with a counter-current of the clarified liquid require disconnection of the flanges of the inlet pipe and the supply pipe.

Moreover, the arrangement of the inlet pipes for the liquid to be purified on the housing of the filter within the chamber for the purified liquid affects the uniformity of the distribution of the liquid to be purified across the section of the filter, on account of the liquid being guided-in at a single point, whereas incorporation of various distribution means complicates the construction of the filter and increases the amount of metal therein.

It is an object of the present invention to create a self-cleaning filter wherein the arrangement of the inlet pipe for the liquid to be purified on the housing should enhance the reliability of the performance of the filter.

It is another object of the present invention to facilitate the adjustment and maintenance of the filter.

With these and other objects in view, proposed herein is a self-cleaning filter for purifying a liquid from particles suspended therein, having a housing with pipes for the inlet of the liquid to be purified and for the outlet of the clarified liquid, accommodating at least one filtering partition dividing the internal space of the housing into chambers for the liquid to be purified and the clarified liquid, and a device for flushing this partition with a counter-current of the liquid, in which filter, in accordance with the invention, the pipe for the inlet of the liquid to be purified is arranged on the housing within the chamber for the clarified liquid, so that the geometric axis thereof is substantially parallel with the plane of the filtering partition, and communicates with another pipe extending centrally of the chamber for the clarified liquid, so that the geometric axis thereof is substantially perpendicular to the plane of the filtering partition, the latter having made therein an opening whose edges are connected with this another pipe for supplying the liquid into the chamber for the liquid to be purified.

A self-cleaning filter constructed in accordance with the present invention, intended for purifying a liquid from particles suspended therein, offers reliable performance, owing to a better distribution of the liquid across the section of the filter. The arrangement of the inlet pipe for the liquid to be purified in accordance with the invention facilitates adjustment of the flushing devices and simplifies the maintenance of the filter, since these operations no longer require disconnection of the flanges of the inlet pipe and of the supply pipe.

Given hereinbelow is a detailed description of an embodiment of the invention, with reference being had to the accompanying drawings, wherein.

Figure 1:
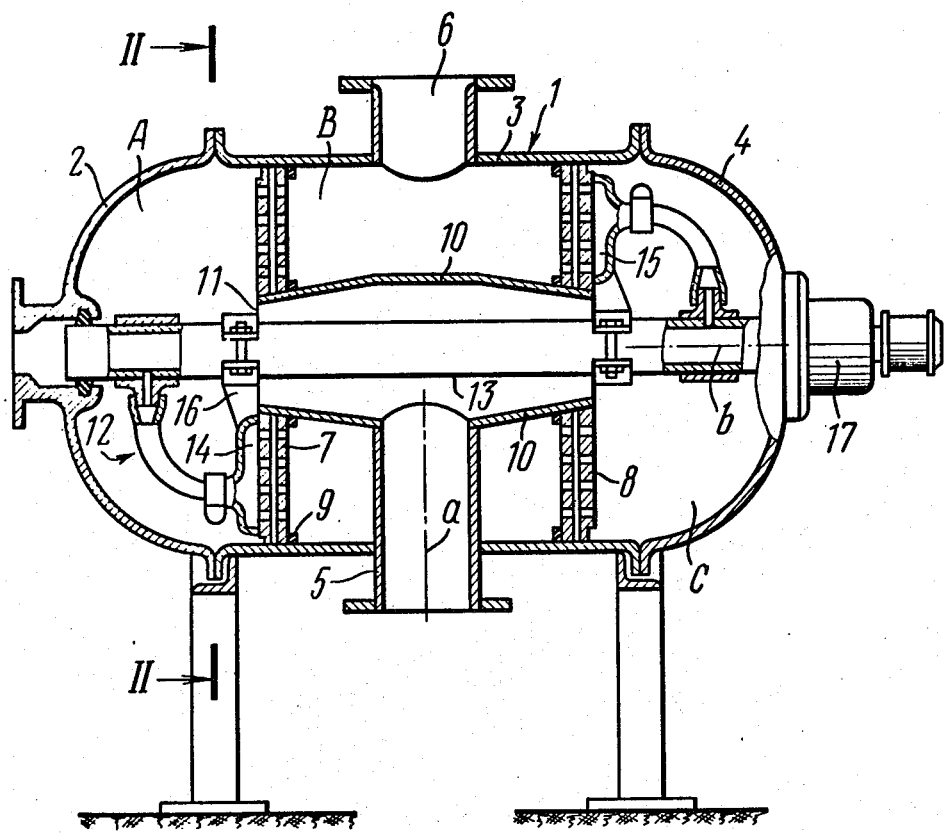
FIG. 1 is a longitudinally sectional view of a self-cleaning filter for purifying a liquid from suspended particles, embodying the invention.

Referring now to the drawings, the self-cleaning filter for purifying a liquid from suspended particles comprises a housing or shell 1 (FIG. 1) which is made up of three shell parts 2, 3 and 4. The shell part 3 of the housing 1 includes an inlet pipe 5 for the liquid to be purified and an outlet pipe 6 for the clarified liquid. The housing 1 accommodates therein two filtering partitions 7 and 8 spaced from each other. The filtering partitions 7 and 8 are secured along their peripheries with uniformly circumferentially spaced bolts to internal flanges 9 welded to the shell part 3 of the housing 1.

The filtering partitions 7 and 8 define within the housing 1 three chambers A, B and C of which the chambers A and C are adapted to contain the liquid to be purified, and the chamber B is adapted to receive the clarified liquid.

The inlet pipe 5 for the liquid to be purified is arranged on the housing 1 centrally of the latter, i.e. within the chamber B for the clarified liquid, with the geometric axis "a" of the pipe 5 being parallel with the planes of the filtering partitions 7 and 8. The inlet pipe 5 communicates with another supply pipe 10 for the liquid to be purified, extending centrally of the chamber B so that its geometric axis "b" is perpendicular to the planes of the filtering partitions 7, 8. To direct the liquid from the pipes 5 and 10 into the chambers A and C, the filtering partitions 7 and 8 have made therein central openings 11 of which the edges are connected to the respective end faces of another pipe 10.

The housing 1 receives thereinside devices 12 for flushing the respective partitions 7 and 8 with a counter-current of the liquid.

Figure 2:
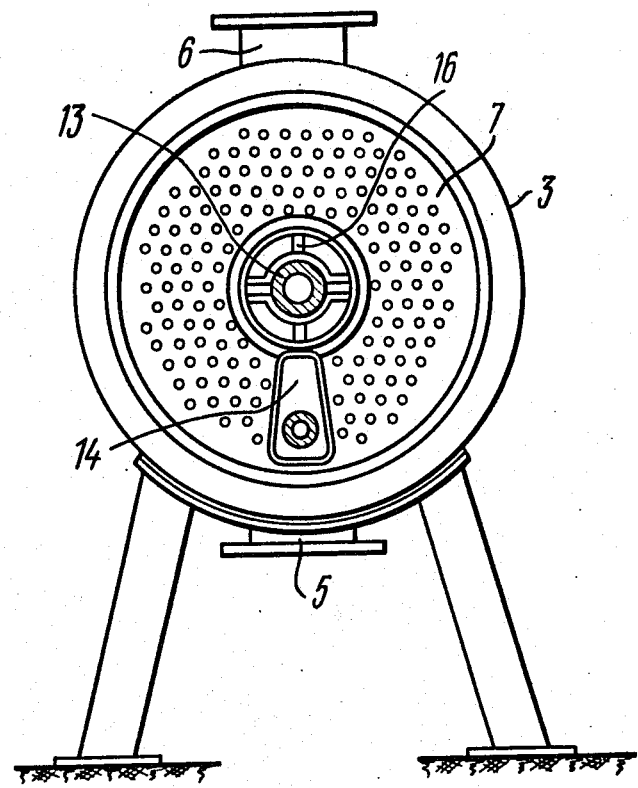
FIG. 2 is a sectional view of the filter, taken on line II—II of FIG. 1.

Each device 12 includes a hollow shaft 13 extending in the housing 1 coaxially therewith and two cups 14 and 15 having their open ends engaging the planar side of the filtering partitions 7 or 8, respectively. The internal space of the hollow shaft 13 communicates via in a controllable closure member (not shown), e.g. a tap valve, with a vessel (not shown, either) adapted to receive the counter-current flushing liquid. The shaft 13 is secured to crosspieces 16 (FIG. 2) attached to the respective flushing devices 12.

The herein disclosed self-cleaning filter for purifying a liquid from particles suspended therein operates, as follows.

A liquid contaminated with suspended particles is supplied via the pipes 5 and 10 and openings 11 into the respective chambers A and C where it impinges upon the elliptical bowls of the parts 2 and 4, distributes itself uniformly across the section of the filter and passes through the filtering partitions 7 and 8, whereby the particles suspended in the supplied liquid are detained by these filtering partitions 7 and 8, while the clarified liquid, rid of the previously suspended particles, flows into the chamber "B" of the housing 1 and passes to a consumer via the outlet pipe 6. As the supply liquid is thus passed through the filter, a cake of detained particles accumulates on the filtering partitions 7 and 8, which results in the pressure drop between the chambers A, C and B permanently rising. Upon the pressure drop between said chambers attaining a predetermined value, which is sensed by any known per se instrumentation suitable for the puspose, e.g. a pressure drop meter, the drive 17 (FIG. 1) of the devices 12 for flushing the filtering partitions 7 and 8 with a counter-current of the liquid is energized, and simultaneously the abovementioned closure member is opened to communicate the internal space of the shaft 13 with the vessel receiving the counter-current flushing liquid. Consequently, a portion of the clarified liquid flows from the chamber B of the housing 1 into the respective cups 14 and 15 of the device 12, owing to the pressure drop between the chamber B of the housing 1 and the internal space of the shaft 13, which is under the atmospheric pressure, washing away the detained particles off the partitions 7 and 8 in the areas currently engaged by the moving cups 14 and 15, whereafter these particles are carried away from the filter via the hollow shaft 13 into the vessel or tank receiving the counter-current flushing liquid. While being rotated by the drive 17, the devices 12 provide for flushing of the entire surface of the respective filtering partitions 7 and 8. Following a predetermined time interval preset with a suitable known per se control instrument, e.g. a timer relay, the drive 17 is deenergized, and the closure member is closed. It can be seen that the operation of the flushing the filtering partitions 7 and 8 is conducted without interruption of the filtering process. The arrangement of the pipes 5 and 10 through which the liquid to be purified being such that this liquid enters the chambers A and C through the central openings of the respective filtering partitions 7 and 8, the liquid is more uniformly distributed across the section of the filter, which renders its performance more reliable, simplifies the maintenance of the filter and the adjustment of the counter-current flushing devices 12, by requiring no longer the disconnection of the inlet pipe 5 from the supply pipe (not shown).

What is claimed is:

1. A self-cleaning filter for purifying a liquid of particles suspended therein, comprising: a housing; at least one filtering partition accommodated within said housing; a chamber for a liquid to be purified defined within said housing to one side of said filtering partition; a chamber for the clarified liquid defined within said housing to the opposite side of said filtering partition; a pipe for the inlet of the liquid to be purified into said chamber for the liquid to be purified, arranged on said housing within said chamber for the clarified liquid and having its geometric axis extending substantially parallel with the plane of said filtering partition; another pipe extending centrally of said chamber for the clarified liquid, having its geometric axis substantially perpendicular to the plane of said filtering partition and communicating with said inlet pipe for the liquid to be purified; an opening made through said filtering partition, of a size and shape corresponding to the size and shape of the cross-section of said another pipe; said another pipe being connected to the edges of said opening to supply the liquid to be purified into said chamber for the liquid to be purified; the arrangement of said pipes, effecting the supply of said liquid to be purified, within said chamber for clarified liquid providing for uniform distribution of the liquid to be purified across the section of the filter and facilitating the dismantling of the filter for replacement of said filtering partition during the service life of the filter; an outlet pipe for the clarified liquid arranged on said housing within said chamber for the clarified liquid; means for flushing said filtering partition with a current of the liquid, flowing in a reverse direction upon the pressure drop between said chambers for the liquid to be purified and the clarified liquid attaining a predetermined value, said flushing means including a hollow shaft rotatably mounted in said housing and disposed substantially coaxially within said another pipe, means coupled to said hollow shaft for rotation therewith engaging said filtering partition on the side thereof defining said chamber for the liquid to be purified for receiving the current of reverse flowing liquid and means fluidly communicating said engaging means for directing the reverse flowing liquid to the interior of said hollow shaft.

* * * * *